United States Patent Office 2,867,921
Patented Jan. 13, 1959

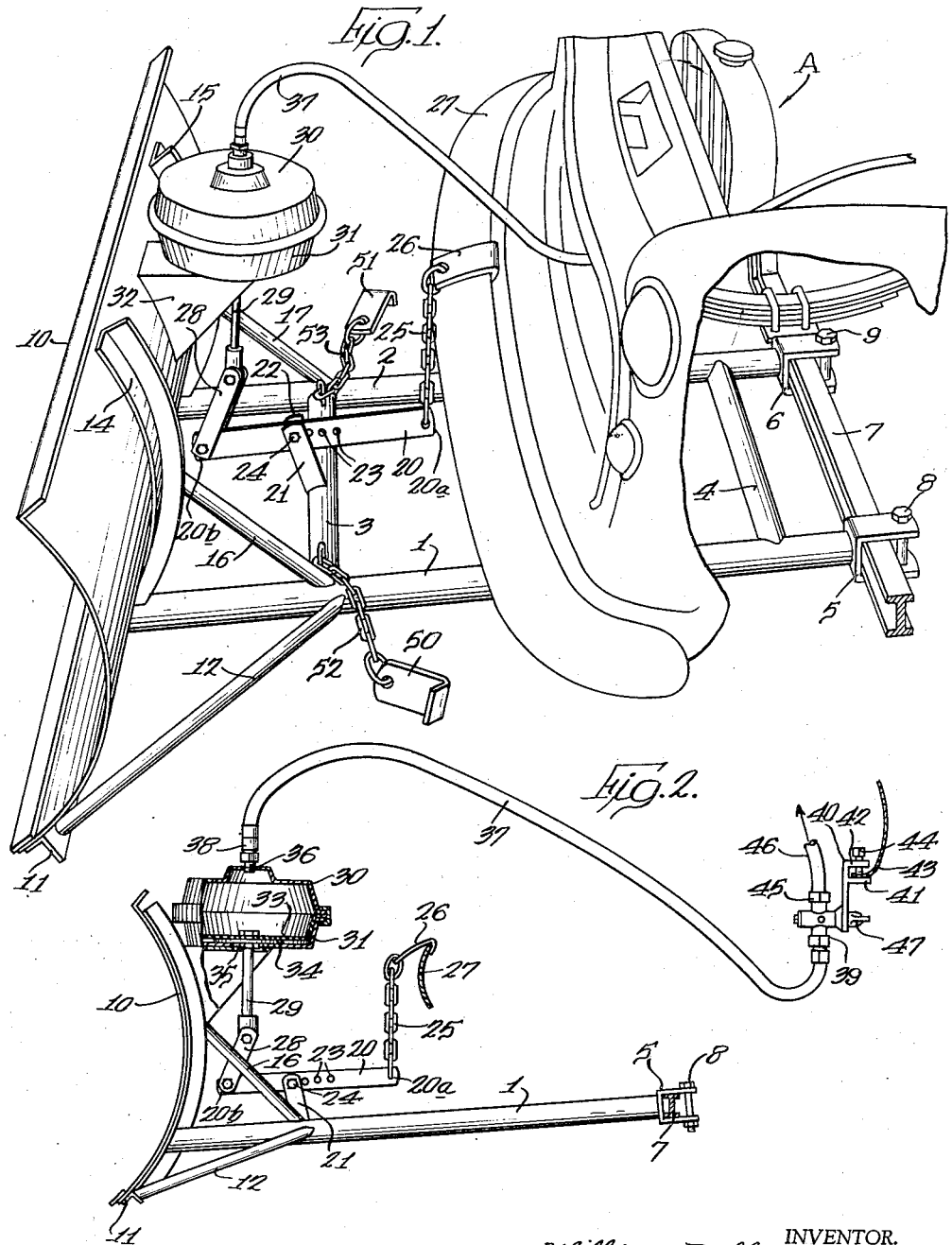

2,867,921

POWER-OPERATED IMPLEMENT ATTACHMENT

William Delbert Brown, Woodbine, Iowa

Application January 25, 1957, Serial No. 636,382

4 Claims. (Cl. 37—42)

This invention relates to an implement attachment for a vehicle, and more particularly to a snowplow attachment.

An object of this invention is to provide a new and improved power-operated implement attachment for a vehicle which may be readily attached to or detached from the vehicle.

Another object of the invention is to provide a snowploy attachment for a vehicle, such as a truck, having self-contained mechanism for moving the snowplow relative to the vehicle including a motor carried on the snowplow.

Other objects of the invention are to provide a snowplow attachment in which the frame thereof is movably mounted on a vehicle axle by clevises and may be detached therefrom by removal of clevis pins and is movable relative to the vehicle by a leverage mechanism including a connection to the vehicle and a differential pressure motor carried on the snowplow blade. The connection to the vehicle and to the motor may be quickly released so as to facilitate detachment of the snowplow from a vehicle.

A further object of the invention is to provide an implement movable relative to a supporting vehicle including a leverage mechanism on the implement frame having a member adapted to connect to a part of the vehicle and a motor on the frame for operating the leverage mechanism to raise the frame relative to the vehicle.

Another object of the invention is to provide in a snowplow attachment for a vehicle, in combination, a frame detachably connectible to the vehicle, a blade on the frame, a lever pivoted intermediate its ends on the frame and between the blade and the vehicle, a member adapted to connect one end of the lever to the vehicle to prevent downward movement of said one end relative to the vehicle, a reciprocable member connected to the other end of the lever and movable relative to the frame, and a vacuum chamber motor on the frame for moving the member relative to the frame to move the frame relative to the vehicle.

The objects of the invention generally set forth together with other ancillary advantages are attained by the construction and arrangement shown by way of illustration in the accompanying drawing, in which:

Fig. 1 is a perspective view of the snowplow attachment connected to the front axle of a vehicle which is shown in part; and Fig. 2 is a side view in elevation of the snowplow in lowered position with parts of the vehicle in section looking toward the snowplow, as shown in Fig. 1, also with the motor shown partly in section.

While this invention is susceptible of embodiment in many different forms, there is shown in the drawings and will herein be described in detail an illustrative embodiment of the invention with the understanding that the present disclosure is to be considered as an exemplification of the principles of the invention and is not intended to limit the invention to the embodiment illustrated. The scope of the invention will be pointed out in the appended claims.

An implement, which is disclosed as a snowplow attachment, includes a pair of elongated frame members 1 and 2 connected by a pair of transverse frame members 3 and 4. The frame members 1 and 2 at one end each has a U-shaped clevis 5 and 6, respectively, adapted to loosely fit on a front axle 7 of a vehicle, such as a truck, indicated generally at A. Although the front axle 7 is shown as having an I shape, the clevises may also attach to a tubular-shaped axle. The clevises 5 and 6 each has a removable clevis pin 8 and 9, respectively, to secure the clevises to the axle.

The frame members 1 and 2 carry a blade 10 suitably attached to the front ends thereof opposite the ends carrying the clevises 5 and 6, and bracing struts are connected between the frame members and an L-shaped bar 11 extending along the bottom of the blade, one of these bracing struts being shown at 12. The blade 10 is reinforced by braces 14 and 15, and additional struts 16 and 17 extend between the frame members and these braces.

Means are provided for raising and lowering the snowplow relative to the vehicle 8 and include a leverage mechanism. This leverage mechanism comprises a lever 20 pivotally connected intermediate its ends to spaced apart ears 21 and 22 extending upwardly from and secured to the transverse frame member 3. The lever 20 is provided with a series of adjustment holes 23, through one of which a pin 24 may pass to pivotally connect the lever on the transverse frame member 3. The adjustment holes 23 enable a change of leverage when needed, as the lifting power needed will vary depending upon whether the snow handled is light and dry, or wet and sticky. In the position shown in Figs. 1 and 2, the minimum lifting power will be obtained, but the up and down movement of the blade 10 would be the maximum. If the lever 20 were connected in the adjustment hole 23 furtherest toward the right, looking toward Figs. 1 and 2, the maximum lifting power would be provided and would result in a lesser up and down movement of the blade 10. The range of blade travel is approximately 10 to 14 inches, and the upper limit is reached when the frame members 1 and 2 engage parts of the vehicle frame.

An end 20a of the lever 20 has a member 25 connected thereto which may be in the form of a chain, and the opposite end of this member carries a hook 26 which, when fitted over a front bumper 27 of the vehicle 8, will securely hold to the bumper and prevent downward movement of the end 20a of the lever. An opposite end 20b of the lever 20 is pivotally connected to a link 28, and the other end of the link is pivotally connected to an upwardly extending, reciprocable rod 29.

A motor 30 of the vacuum chamber type, wherein a differential pressure is created on opposite sides of a diaphragm, has a casing 31 secured to a bracket 32 fastened on the rear side of the blade 10. As shown in Fig. 2, the motor has a circular diaphragm 33 secured at its perimeter between halves of the casing 31. The diaphragm 33 is capable of moving from the position shown in Fig. 2 to an upper position wherein it lies closely adjacent the inside of the upper part of the casing 31. The diaphragm 33 has a metal plate 34 on its upper side, and the rod 29 extends upwardly through an enlarged opening 35 in the under side of the casing 31 and through the metal plate 34 and diaphragm 33. The rod is connected for movement with the plate and diaphragm by means of nuts threaded thereon above and below the plate and diaphragm.

An inlet 36 to the motor casing may connect to a hose 37 by a quick-snap coupling 38, and the hose 37, at its other end, connects to a valve 39. As shown in Fig. 2, the valve 39 is mounted on a frame 40 having spaced ears 41 and 42 between which the lower edge 43 of a vehicle dashboard may be received, and the frame 40 may be clamped thereto by an adjustable screw 44. The valve 39 has an inlet 45 connected by a hose 46 which connects to the manifold of the vehicle motor, and this may be accomplished by connection to a T fitting placed in the hose leading to the windshield wipers. The valve 39 has a control handle 47, and the handle may be adjusted either to draw a vacuum in the motor casing 31 above the diaphragm 33 or to vent this area.

When the snowplow is raised and not in use, it may be held in its upper position by a pair of hooks 50 and 51 secured by chains 52 and 53 to the frame, the hooks engaging the vehicle bumper 27. In operation, with the snowplow lowered, as shown in Fig. 2, the drawing of a vacuum within the casing 31 above the diaphragm 33 will raise the rod 29; and, since the end 20a of the lever 20 is held against downward movement, this will elevate the pivot for the lever with resulting elevation movement of the frame and blade 10. During this movement, there is a slight rocking movement of the rod 29 which is permitted by the size of the opening 35 in the under side of the motor casing 31. When it is desired to lower the blade 10, the valve 39 may be operated to vent the upper part of casing 31, and the diaphragm 33 and rod 29 may then move downwardly.

If it is desired to remove the snowplow from the vehicle, this may be accomplished by pulling the clevis pins 8 and 9, detaching the bumper engaging hook 26, and disengaging the hose 37 from the motor 30 by release of the quicksnap coupling 38. These operations, as will be obvious, may be reversed to attach the snowplow to the vehicle.

I claim:

1. In a snowplow attachment for a vehicle, in combination, a frame detachably connectible to a vehicle, a blade on the frame, a lever pivoted intermediate its ends on the frame and between the blade and the vehicle, a member adapted to connect one end of the lever to the vehicle to prevent downward movement of said one end relative to the vehicle, a reciprocable member connected to and extending upward from the other end of the lever and movable relative to the frame, and means on the frame for moving the member relative to the frame.

2. In a snowplow attachment for a truck, in combination, a frame detachably connectible to a truck front axle, a lever pivoted intermediate its ends on the frame forwardly of the truck, a hook member adapted to connect one end of the lever to the truck front bumper to prevent downward movement of said one end relative to the truck, a reciprocable member connected to the other end of the lever and movable relative to the frame, and a motor carried on the frame for moving the member relative to the frame to move the frame relative to the truck.

3. A snowplow attachment for a vehicle comprising, in combination, a frame including a pair of frame members adapted at one end to connect to a vehicle axle, a blade secured to the other ends of said frame members, a transverse frame member connected between said pair of frame members, a lever pivoted intermediate its ends on the transverse frame member, a member extending upwardly from one end of the lever and including a hook adapted to catch on a vehicle bumper to prevent downward movement of said one end of the lever, a flexible linkage connected to the other end of the lever including an upwardly extending rod, a vacuum chamber motor having a casing secured to the back side of said blade and having a diaphragm operatively connected to the rod extending downwardly therefrom, and selectively operable means detachably connected to the motor including a control valve adapted to mount on the vehicle dashboard for drawing a vacuum in the upper side of the diaphragm to raise the rod and frame.

4. A snowplow attachment for a vehicle comprising, in combination, a frame to movably connect to a vehicle, a blade secured to said frame, a lever pivoted intermediate its ends of the frame, a member extending upwardly from one end of the lever and adapted to fasten on the vehicle to prevent downward movement of said one end of the lever, a rod operatively connected to the other end of the lever, a differential pressure motor having a casing immovably secured relative to the frame and having a diaphragm operatively connected to the rod extending downwardly therefrom, and selectively operable means including a control valve for applying a differential pressure on opposite sides of the diaphragm to move the rod and raise the frame.

References Cited in the file of this patent

UNITED STATES PATENTS

| 2,264,368 | Gettleman | Dec. 2, 1941 |
| 2,442,095 | Reed et al. | May 25, 1948 |

FOREIGN PATENTS

| 913,047 | France | May 20, 1949 |
| 128,695 | Sweden | June 27, 1950 |